Sept. 18, 1962 M. C. DARLING 3,054,384
PISTON VELOCITY GOVERNOR
Filed Jan. 12, 1961 2 Sheets-Sheet 1

MARVIN C. DARLING
*INVENTOR.*
BY *Hubert Miller*
ATTORNEY

Sept. 18, 1962     M. C. DARLING     3,054,384
PISTON VELOCITY GOVERNOR

Filed Jan. 12, 1961     2 Sheets-Sheet 2

MARVIN C. DARLING
*INVENTOR.*

BY

ATTORNEY

United States Patent Office 3,054,384
Patented Sept. 18, 1962

3,054,384
PISTON VELOCITY GOVERNOR
Marvin C. Darling, Hutchinson, Kans., assignor to The Cessna Aircraft Company, Wichita, Kans., a corporation of Kansas
Filed Jan. 12, 1961, Ser. No. 82,189
11 Claims. (Cl. 121—38)

My invention relates generally to fluid motors of the cylinder and piston type, and more particularly to a system or hydraulic mechanism for controlling or governing the velocity at which a piston may travel in its cylinder.

Hydraulic motors of the piston type which operate under high pressures and which handle heavy loads are very difficult to control by a hand operated control valve. This is due not only to the high pressures involved and the consequent rapid piston movement, but also to the gravity and inertia effects of the load on piston travel.

My invention provides an automatic hydraulic control mechanism for any hydraulic working cylinder, whether single acting or double acting, which mechanism is adjustable to selectively limit the maximum velocity of the piston throughout the major portion of its permitted travel in either or both directions, and which will quickly decelerate and cushion the stop of the piston as it approaches and reaches the end of its permitted travel. Governing mechanisms embodying my invention are virtually unaffected by external load and gravity forces acting on the piston, by hydraulic pressure variations acting on the piston, or by variations in back pressure in the fluid return line between the cylinder and the control valve.

The invention, together with other objects will be more clearly understood when the following description is read in connection with the accompanying drawings, in which.

Generally, the piston velocity limiting function is provided by a floating spool type flow restricting member which operates in a transverse passage which intersects the usual inlet-outlet passage near either end of the cylinder, such member being capable of restricting the outward flow of fluid from the cylinder through the inlet-outlet passage. One end of the flow restricting member is subjected to pressure existing in the inlet-outlet passage, while the opposite end of the floating member is subjected to pressure existing in the cylinder between the piston and the adjacent end of the cylinder. The floating member is spring urged in a non-flow restricting direction, and the compression force exerted by the spring is adjustable. The floating member is thus movable to vary the permitted volume flow of fluid outward through the inlet-outlet passage in response to a differential pressure arising in the cylinder sufficiently great to overcome the spring. The degree of restriction limits maximum piston velocity, and this degree of restriction may be varied by selectively varying the force exerted by the spring on the flow restricting member.

A supplemental feature of my invention includes an additional flow restricting or metering member physically movable by and with the piston, and effective only as the piston approaches the extreme end of its permitted travel to independently and progressively restrict the volume flow of fluid from the cylinder outward, thus rapidly decelerating the piston travel and providing a cushioned stop.

It is believed that the invention can be more clearly understood by concurrently describing its construction and operation.

Figure 1:
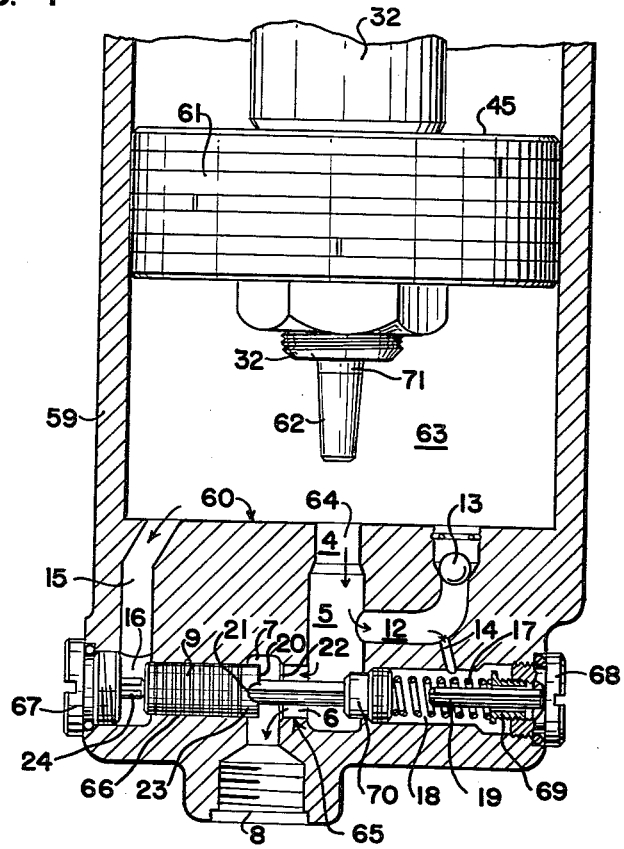
FIG. 1 is a fragmentary vertical sectional view through a working cylinder, one control mechanism embodying my invention being installed in the head or end wall of the cylinder.

Referring to FIG. 1, there is illustrated a piston 61 reciprocable in a cylinder 59, the adjacent end of which is closed by a head or end wall, designated as a whole by the numeral 60. A pressure chamber 63 is thus defined by the piston 61, the end wall 60 and the cylinder wall.

End wall 60 defines an inlet-outlet passage designated as a whole by the numeral 64. This inlet-outlet passage includes a reduced diameter or otherwise restricted orifice 4 opening into chamber 63, communicating passages 5, 6 and 7, and a communicating inlet-outlet port 8. End wall 60 also defines a transverse passage, designated as a whole by the numeral 65, which is made up of duct 15 which communicates with chamber 63, pressure chamber 16, spool bore 66, common portions of passages 5, 6, and 7, and chamber 18, passage 6 and chamber 18 being continuations of spool bore 66. The opposite ends of transverse passage 65 are closed by plugs 67 and 68, which respectively carry movement limit stops 24 and 19 to limit the movement of a spool 9 in both directions. Additionally plug 68 carries a spring seat 69 which is threaded into the plug and may therefore be rotated in either direction to vary the force transmitted by a coil spring 17 against the head 70 of the spool 9.

A by-pass duct 12 communicates at one end with the inlet-outlet passage 64, and at its other end with the cylinder chamber 63. A check valve 13 in one end of the duct 12 prevents the out flow of fluid from chamber 63 into passage 64, but permits reverse flow. A short duct 14 affords communication between duct 12 and the chamber 18, thus subjecting the head 70 of spool 9 to the pressure which exists in passage 5.

It will be seen that spool 9 is provided with a skirt portion 23, which in turn is provided with a fluid metering notch 21 cut into the edge of the skirt.

*Operation—Embodiment No. 1*

As piston 61 moves toward the end 60 of the cylinder, either due to a load applied on the remote end of the piston rod 32, or due to fluid pressure applied to the face 45 of the piston, fluid in chamber 63 is forced through orifice 4, on through the passage 64 and out through port 8. The spool 9 is normally held against its stop 24 by the spring 17, which normally keeps passage 6 completely open and unobstructed. Fluid flow through the reduced diameter orifice 4, when the velocity flow becomes sufficient, will build up pressure in chamber 63 and create a pressure differential between that chamber and the passage 5. The opposite ends of spool 9 will thus be subjected to these different pressures.

When this pressure differential becomes sufficiently great, the force applied to the left end of spool 9 through duct 15 will overcome the force of spring 17 acting on the opposite end 70 of the spool, and the entire spool will move to the right in the drawing. Restriction of flow through passage 6 will begin almost immediately, and progressively increases with continued spool movement.

As the edge 20 of spool 9 enters passage 6 the control edge 22 of that passage will cooperate with edge 20 of the spool to force all fluid flowing from chamber 63 to flow only through the orifice 21. This orifice 21 will decrease in size as spool 9 moves to the right, and will increase as the spool moves to the left. As the fluid flow is restricted by spool 9 the pressure in passage 5, duct 12, and in chamber 18 will increase. This increase will reduce the pressure differences between chamber 16 and chamber 18, which will allow spring 17 to move the spool 9 to the left. This floating action of the spool will prevent the pressure difference between chambers 63 and 18 from exceeding a predetermined value, which value is determined by the compression force exerted by spring 17, which in turn can be selectively varied by the adjustment of spring seat 69. Naturally the speed at which piston 61 may travel is limited by the permitted rate of flow of fluid through passage 64.

Supplementally my invention provides a stop cushioning means which is movable by and with the piston as it nears the end wall 60 to additionally and progressively restrict the flow of fluid from cylinder chamber 63 outward through the inlet-outlet passage 64. In the FIG. 1 embodiment this means is in the form of a tapered metering pin 62 carried by piston 61 in a position aligned with the longitudinal axis of orifice 4.

As the piston continues its travel toward end wall 60, pin 62 will enter orifice 4, progressively reducing the size of that orifice. Since spool 9 is at this time limiting the pressure differential between chambers 63 and 18 to a substantially constant value, the amount of fluid which can flow through orifice 4 is dependent on the permitted flow area after pin 62 has begun to enter that orifice. The progressive reduction of the flow area through orifice 4 by the metering pin 62 will quickly decelerate the travel of piston 61 until the flow from chamber 63 and the velocity of the piston have reached a minimum determined by the flow area through orifice 4 after pin 62 has fully entered into it. It is preferred that the cylindrical portion 71 of the pin 62 be of substantially the same diameter as the interior diameter of orifice 4 so that the portion 71 entering the orifice substantially stops all flow of fluid from the chamber 63. When this flow is stopped the piston, of course, will have come to a cushioned stop, and the pressure in chambers 63, 16, 5 and 18 will equalize, and spool 9 will be returned to a position against its stop 24, by the spring 17.

To move the piston in the opposite direction, pressure fluid is introduced through port 8 into the inlet-outlet passage 64. The fluid will be by-passed through duct 12 and past check valve 13 to initiate the movement of piston 61. This movement will very quickly move the metering pin 62 out of orifice 4, which will allow fluid to enter the chamber 63 directly through that orifice.

From the above it will be seen that the described hydraulic control mechanism will limit the maximum velocity of piston 61, due to the restriction of the volume flow of fluid from the chamber 63, throughout the major portion of its travel, and until the metering pin 62 begins to enter orifice 4. Thereafter the described cushioning means will bring the piston to a cushioned stop.

*Embodiment No. 2*

Throughout the following description like reference numerals have been used to designate like parts or elements which have previously been described in connection with the No. 1 embodiment.

Figure 3:
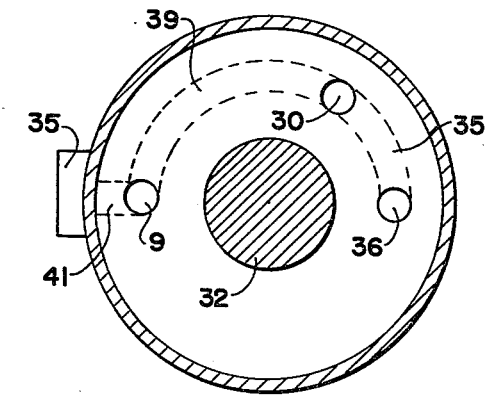
FIG. 3 is a transverse sectional view through the cylinder of FIG. 2 and is taken along the line 3—3 of FIG. 2.
Figure 2:
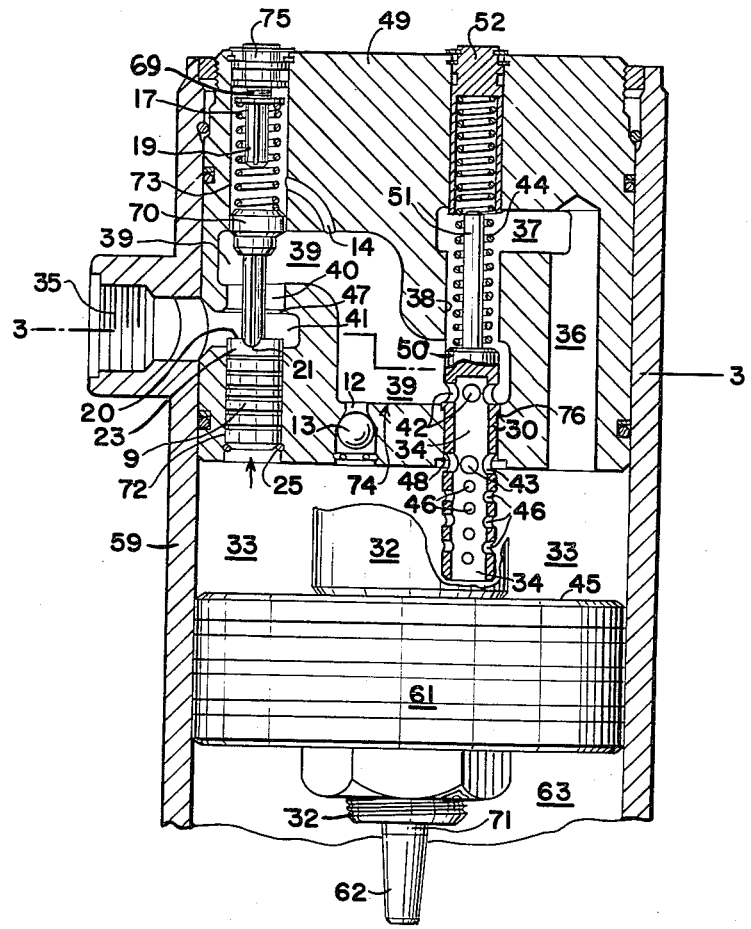
FIG. 2 is a similar view showing a second type of control mechanism embodying my invention installed in that end of the cylinder through which the piston rod reciprocates, the section being shown in flat pattern for clarity, but actually being taken around the piston rod.

The primary difference between the embodiment of the invention illustrated in FIGS. 2 and 3 and the one illustrated in FIG. 1 is in the type of supplemental stop cushioning means movable by and with the piston as the plunger nears the cylinder end wall, to additionally and progressively restrict the flow of fluid from the cylinder outward through the inlet-outlet passage at the rod end of the cylinder. This difference is necessitated by the central location of the piston rod 32. The central location of the piston rod makes it impractical to use a metering pin as the additional flow restricting means. The location of the piston rod also makes it necessary to locate the various parts and their connecting ducts and chambers around the piston rod in an end wall 49, the arrangement being clearly shown in FIG. 3.

In the FIG. 2 embodiment the inlet-outlet passage is designated as a whole by the numeral 74. This passage 74 is made up of inter-communicating ducts and passages 36, 37, 38, 39, 40, 41, and outlet-inlet port 35. The intersecting flow restricting passage is made up of spool bore 72—73, and the common portions of passages 39, 40 and 41. Passage 40 is in effect a continuation of the spool bore 72—73 and is the passage through which fluid flow is restricted by the skirt edge 20 of the spool 9, and its orifice or notch 21. A branch entrance into the inlet-outlet passage 74, intermediate its end, is provided by orifices 42, 43, 46, and by the bore 34 of a plunger 30. As in the No. 1 embodiment, a by-pass passage 12 and a check valve 13 affords one way communication between the cylinder chamber 33 and the passage 74.

As shown, the movement of plunger 9 in one direction is limited by the stop 19, carried by plug 75, which may be of the same construction as the plug 68, including a spring seat 69, to afford compression force adjustment for the spring 17. Movement of plunger 9 in the opposite direction is limited by a stop 25, in the form of a snap ring seated in the end of the bore 72.

The flow restricting orificed plunger 30 has one closed end 50, which serves as a means of completely blocking flow of fluid from the chamber 33 through the passages 36, 37 and 38 when the end 50 of the plunger is forced into the bore 38. The plunger carries a central stop rod 51 which contacts the inner end of a plug 52 to limit inward movement of the plunger. The plunger is also provided with a shoulder 76 which contacts a mating portion of the end wall to limit movement of the plunger in the opposite direction. A spring 44 bearing against the plug 52 and against the head 50 of the plunger serves to maintain the plunger in the position shown in FIG. 2 until such time as it is contacted by the approaching piston 61.

*Operation—FIG. 2 Embodiment*

The operation of the differential pressure controlled flow restricting plunger 9 of the FIG. 2 embodiment is identical to the operation of the plunger 9 in the FIG. 1 embodiment. This mechanism, then, serves to limit the maximum velocity of the piston from the time it leaves the head end of the cylinder until the time the piston contacts the adjacent end of the reciprocable plunger 30. Throughout this time fluid may enter the inlet-outlet passage 74 from the passage 36, or through the bore 34 and orifices 42 of plunger 30.

As the face 45 of the piston 61 contacts the adjacent end of plunger 30, that end of the plunger bore 34 is closed and fluid can then flow only through the orifices 43 and 46 into bore 34. As the piston movement continues plunger 30 is moved inwardly and the plunger end 50 enters the bore 38 and completely blocks the further flow of fluid from the chamber 33 into the inlet-outlet passage 74 through the bore 38. At this time orifices 43 are also blocked by entry into that portion 48 of the plunger bore. All flow from cylinder chamber 33 into inlet-outlet passage 74 must then be through the orifices 46 and 42.

As plunger 30 is moved further inward by piston travel the orifices 42 are blocked off by the wall of bore 38, and the orifices 43 simultaneously are moved to a position to communicate with the passage 39. Also simultaneously, certain of the innermost orifices 46 are blocked off by the bore 48, and fluid flow into the inlet passage 74 and its chamber 39 is thus further restricted.

As piston 61 continues its travel toward end wall 49, and plunger 30 likewise continues its inward travel, the last of the orifices 46 are gradually closed by the bore 48 and the piston comes to a cushioned stop. Throughout this latter portion of piston travel the piston has been progressively decelerated by the additional and progressive restriction of flow of fluid from the chamber 33 into the inlet-outlet passage 74.

From the above description it will be seen that the piston travel governing mechanism or system illustrated in FIG. 2 can be applied equally well to either end of a cylinder, and to either a single acting or double acting cylinder, regardless of the hydraulic pressure under which the cylinder is operating.

Having described the invention with sufficient clarity to enable those familiar with this art to construct and use it, I claim:

1. In a fluid motor which includes a cylinder having an end wall, and a piston reciprocable in the cylinder, a piston velocity governing system comprising: a fluid inlet-outlet passage in the end wall communicating with the adjacent end of the cylinder at a first location; a transverse passage in the end wall communicating with the same end of the cylinder at a second location and intersecting the inlet-outlet passage; and means including a pressure moved plunger reciprocable in said transverse passage and capable of variably restricting the volume flow of fluid outward through the inlet-outlet passage in response to a predetermined increase in pressure in the cylinder with respect to the pressure in said inlet-outlet passage; said plunger having biasing means continuously biasing the plunger toward a fully open position opening said inlet-outlet passage.

2. The system described in claim 1, and means movable by and with the piston to additionally and progressively further restrict the flow of fluid from the cylinder outward through said inlet-outlet passage as the plunger nears the end wall to rapidly decelerate and cushion the stop of said piston.

3. In a fluid motor which includes a cylinder having an end wall, and a piston reciprocable within the cylinder, a piston velocity governing system comprising: a fluid inlet-outlet passage in the end wall communicating with the cylinder; a transverse passage in the end wall communicating with the inlet-outlet passage and independently communicating with the cylinder; a floating plunger in said transverse passage having one end exposed to fluid pressure in said cylinder and its other end exposed to the fluid pressure in said inlet-outlet passage, and movable in response to a fluid pressure in said cylinder which exceeds the fluid pressure in the inlet-outlet passage to variably restrict the volume flow of fluid outward from the cylinder through said inlet-outlet passage.

4. The system described in claim 3 and a spring normally exerting a force on said plunger to move it away from a flow restricting position.

5. The system described in claim 3, and means movable by and with the piston to additionally and progressively further restrict the flow of fluid from the cylinder outward through said inlet-outlet passage as the plunger nears the end wall to rapidly decelerate and cushion the stop of said piston.

6. The system described in claim 5, and a by-pass passage in the end wall communicating at one end with the cylinder and at its other end with the inlet-outlet passage, and check valve in said by-pass passage affording flow of fluid only from the inlet-outlet passage into the cylinder.

7. In a fluid motor which includes a cylinder having an end wall, and a piston reciprocable in the cylinder, a piston velocity governing system comprising: a fluid inlet-outlet passage in the end wall communicating with the cylinder; a transverse passage in the end wall communicating with the cylinder and intersecting the inlet-outlet passage; means including a pressure differential actuated plunger in said transverse passage capable of variably restricting the volume flow of fluid outward through said inlet-outlet passage in response to the difference in fluid pressure in the cylinder and in the inlet-outlet passage; and means movable by and with the piston to additionally and progressively restrict the flow of fluid from the cylinder outward through said inlet-outlet passage as the piston nears the end wall.

8. In a fluid actuated work performing piston and cylinder assembly, a piston velocity governing system which operates on the principle of automatically and variably controlling the flow of fluid forced from an end of the cylinder during the travel of the piston toward that end, whether or not the piston is performing useful work during such travel, said governing system comprising: a fluid inlet-outlet passage in the cylinder wall; an orifice affording communication between the inlet-outlet passage and the interior of the cylinder; a pressure-differential actuated valve associated with and capable of varying the flow area of said inlet-outlet passage, one portion of said valve being exposed to fluid pressure existing in the inlet-outlet passage adjacent the downstream end of said orifice; and duct means exposing another portion of said valve to fluid pressure existing in the cylinder adjacent the upstream end of said orifice, said valve being responsive to an increase in pressure differential between locations near the upstream and downstream ends of said orifice to decrease the flow area through said inlet-outlet passage.

9. The velocity governing system described in claim 8 and means movable by and with the piston to vary the flow area through said orifice as the piston nears the end of its stroke and to thereby vary the pressure differential existing between locations near the respective upstream and downstream ends of the orifice.

10. Apparatus for controlling the escape of fluid from one end of the cylinder of a fluid motor, comprising means forming a restriction in the fluid passage to that end of the cylinder, a flow control valve in the passage in series with the restriction, an automatic valve control means sensitive to the pressure differential between opposite sides of the restriction and arranged to control the setting of the valve automatically to maintain a predetermined limit to the volumetric rate of flow, and hence a predetermined maximum piston velocity.

11. Apparatus for controlling the escape of fluid from one end of the cylinder of a piston and cylinder motor, comprising the combination of means forming a restriction in the fluid passage to that end of the cylinder, and a spring opened, automatic regulating valve in said passage in series with the restriction in said passage so that the restriction is between the valve and the cylinder, opposite end portions of said valve being connected with the liquid pressure taken on the cylinder side of the restriction and on the valve side of the restriction respectively, and arranged to move the valve to a flow regulating point where the increasing differential pressure is balanced by the increasing force of said opening spring, thereby maintaining a predetermined regulation on the current volume rate of flow and hence a predetermined maximum piston velocity.

References Cited in the file of this patent

UNITED STATES PATENTS

| 875,543 | Lynch | Dec. 21, 1907 |
| 2,618,292 | Ring | Nov. 18, 1952 |
| 2,783,742 | Shafer | Mar. 5, 1957 |

FOREIGN PATENTS

| 213,677 | Austria | Feb. 21, 1961 |
| 393,054 | Great Britain | June 1, 1933 |